(12) United States Patent
Norimatsu et al.

(10) Patent No.: US 7,883,808 B2
(45) Date of Patent: Feb. 8, 2011

(54) POWER SUPPLY APPARATUS WITH FUEL CELL AND METHOD OF CONTROLLING THE SAME

(75) Inventors: Yasuaki Norimatsu, Hitachinaka (JP); Akihiko Kanouda, Hitachinaka (JP); Mutsumi Kikuchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 11/357,029

(22) Filed: Feb. 21, 2006

(65) Prior Publication Data

US 2007/0077468 A1 Apr. 5, 2007

(30) Foreign Application Priority Data

Sep. 30, 2005 (JP) ............................. 2005-286436

(51) Int. Cl.
*H01M 8/04* (2006.01)
(52) U.S. Cl. ...................... 429/432; 429/428; 429/430; 429/431
(58) Field of Classification Search ............ 429/12–46
See application file for complete search history.

(56) References Cited

U.S. PATENT DOCUMENTS 7,381,490 B2 6/2008 Higashionji et al.

| | | | |
|---|---|---|---|
| 2003/0094931 A1* | 5/2003 | Renyolds | 323/285 |
| 2003/0183437 A1* | 10/2003 | Mendoza | 180/272 |
| 2004/0009381 A1* | 1/2004 | Sakai et al. | 429/23 |
| 2004/0232879 A1* | 11/2004 | Wang et al. | 320/103 |
| 2006/0115698 A1* | 6/2006 | Sakai et al. | 429/23 |

FOREIGN PATENT DOCUMENTS

| | | |
|---|---|---|
| CN | 2269691 | 12/1997 |
| CN | 2553414 Y | 5/2003 |
| CN | 1627221 | 6/2005 |
| CN | 1674333 A | 9/2005 |
| JP | 2003-229138 | 8/2003 |
| JP | WO2005/008822 * | 1/2005 |

* cited by examiner

*Primary Examiner*—Dah-Wei D Yuan
*Assistant Examiner*—Steven Scully
(74) *Attorney, Agent, or Firm*—Antonelli, Terry, Stout & Kraus, LLP.

(57) ABSTRACT

A power supply apparatus has a fuel cell unit as a source of input power. A control device limits the output of the fuel cell unit within an operating range of up to a maximum power point, even if a load power is not lower than the maximum power of said fuel cell unit. In addition to the fuel cell, a charge storing device is provided at the output side of the power supply apparatus. The charge storing device is capable of making up a shortage of power of the fuel cell.

3 Claims, 13 Drawing Sheets

POWER SUPPLY APPARATUS WITH FUEL CELL AND METHOD OF CONTROLLING THE SAME

CLAIM OF PRIORITY

The present application claims priority from Japanese application serial no. 2005-286436, filed on Sep. 30, 2005, the content of which is hereby incorporated by reference into this application.

FIELD OF THE INVENTION

The present invention relates to a power supply apparatus using a fuel cell and a method of controlling the same apparatus.

BACKGROUND OF THE INVENTION

With recent advances of electronic technologies, there is an accelerating proliferation of portable electronic equipment such as mobile phones, notebook personal computers, audio/visual devices, and mobile terminal devices. The portable electronic equipment is usable by a secondary battery. New types of secondary batteries have been introduced. With the aim of developing smaller and lighter batteries and those with a higher energy density, the secondary batteries have been evolved from sealed lead batteries to nickel-cadmium cells, nickel-hydrogen cells, and lithium ion cells. For any type of the secondary batteries, cell active materials and high-capacity battery structures are developed to increase energy density and efforts are taken to realize longer life batteries.

Meanwhile, efforts have been made to further reduce the power consumption of portable electronic devices by improving the functions of the devices. However, it is expected that the total power consumption of a portable device will tend to increase in the future, because new functions should be added to provide improved services to meet user needs. Therefore, this will lead to a need for a power supply with a higher energy density, that is, a longer life power supply enabling longer continuous use.

Fuel cells have lately attracted attention as such a power supply. The fuel cells have a property of a maximum power point. The maximum power point is defined as a power point where the output power of a fuel cell changes from increasing to decreasing when the amount of an output current from the cell exceeds a certain threshold value. Therefore, a range of use of fuel cells must be limited up to the maximum power point. For example, for a Polymer Membrane Fuel Cell (PEFC) which is a fuel cell using hydrogen as a fuel, a protective system has been proposed (e.g., Japanese Patent Application Laid-Open No. 2003-229138).

Figure 1:
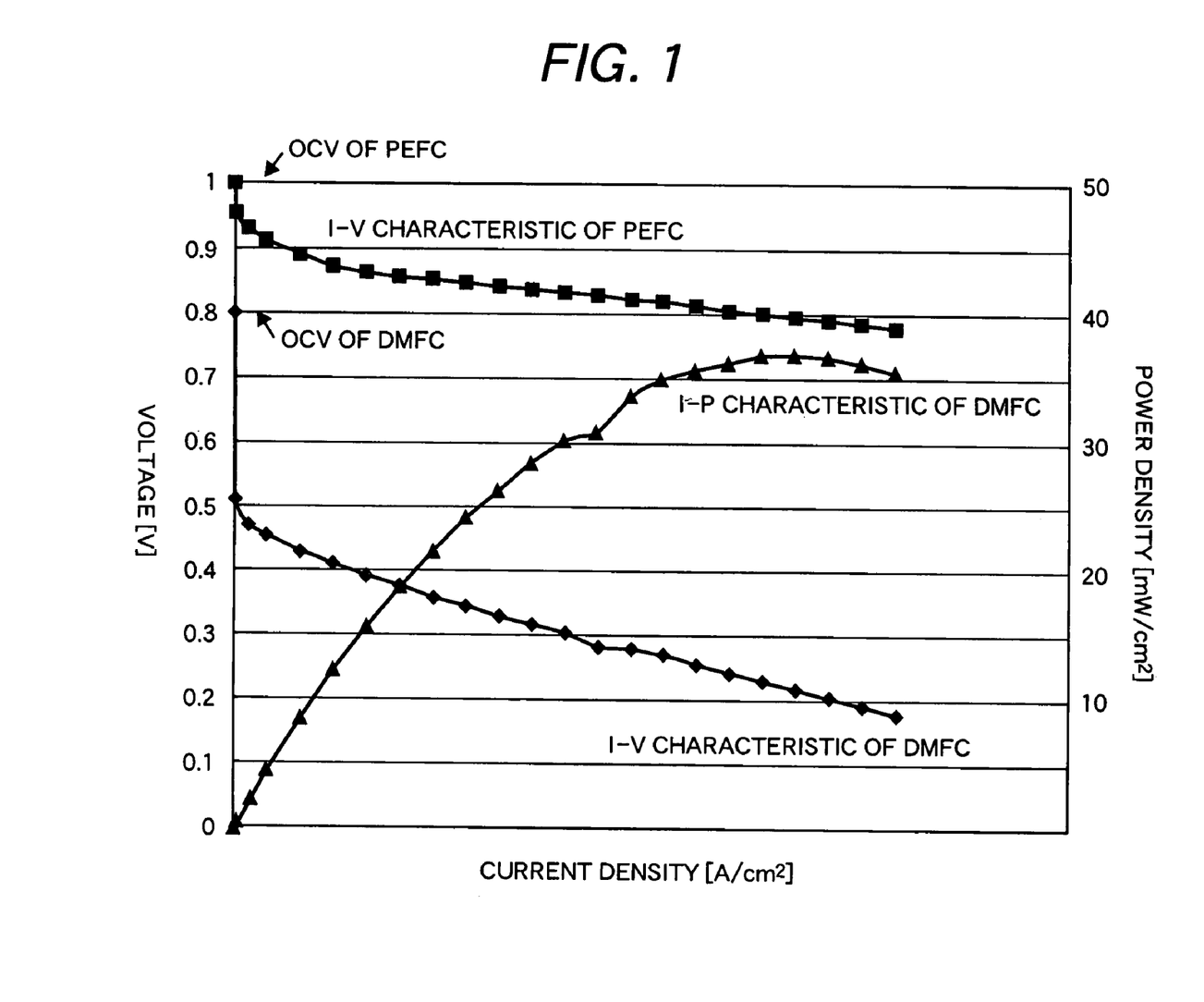
FIG. 1 shows characteristic graphs of the output characteristics of a PEFC and a DMFC.

Recently, a Direct Methanol fuel Cell (DMFC) is expected as a power supply usable in mobile devices under a lower temperature than the PEFC. FIG. 1 shows current-voltage (I-V) characteristics of PEFC and DMFC and a current-power (I-P) characteristic of DMFC. As the characteristics of DMFC, a value of no-load voltage (hereinafter referred to as OCV) may be 0.8 V or above, which is similar to the OCV of PEFC. However, according to a typical voltage-current characteristic of a single DMFC cell, a usable voltage region as actual operating power is 0.4 V and below, and the maximum power point is around 0.2 V. In the DMFC characteristics, the voltage of usable area is remarkably smaller than that of PFFC. Therefore, there is a distinct difference between DMFC and PEFC in characteristics, though both DMFC and PEFC are called fuel cells. It is difficult to directly apply a control practice for PEFC to DMFC, and a control practice specialized for DMFC is required.

The DMFC characteristics greatly vary depending on a working temperature and the flow rate (humidity) of gas at air electrodes. Moreover, the DMFC output power may rapidly decrease for some cause (such as clogging of reaction by-products such as carbon dioxide or water). A minimum requirement for a DMFC used as a power supply is that it is able to supply power required for equipment in which it is used. However, it is supposed that the DMFC may become unable to supply required power according to the condition of the fuel cell as described above. Consequently, a new system and a control method are required.

In a state where a fuel cell cannot supply required power, in particular, the following phenomenon can occur: too much current is drawn from the fuel cell, far exceeding the maximum power point. Drawing excessive current, if occurs, causes problematic conditions such as fuel cell deterioration by polarity inversion, fuel cell temperature rise, and deteriorating performance due to by-products such as carbon dioxide or water. The fuel cell must be controlled adaptively to each of these conditions. However, this poses problems in which state prediction of a high-speed fuel cell is very difficult and provision of a great number of sensors for prediction is costly.

To address the above problems, an object of the present invention is to provide a power supply apparatus and a method of controlling thereof, enabling maximum power point tracking control adaptive to fuel cell conditions by efficient provision of sensors.

SUMMARY OF THE INVENTION

To achieve the above problem, one aspect of the present invention resides in a power supply apparatus having a fuel cell unit as a source of input power. It is characterized by comprising a control device for controlling the amount of power supply so that the operating input voltage range for the power supply apparatus will be not lower than a maximum power point voltage of the fuel cell unit.

To achieve the above object, another aspect of the present invention resides in a power supply apparatus having a fuel cell unit as an input source of input power. It is characterized by comprising a control device which limits the output of the fuel cell unit within operating range of up to a maximum power point, even if a load power is not lower than the maximum power of the fuel cell unit.

To achieve the above object, a further aspect of the present invention resides in a method of controlling a power supply apparatus having a function for voltage conversion from an input end to an output end. It is characterized by providing a fuel cell unit at the input end, providing a charge storing device at the output end, and controlling the output end voltage to be constant, when the power requested at the output end is lower than the maximum power of the fuel cell unit.

According to the present invention, it is possible to provide a power supply apparatus and a method of controlling thereof for realizing the stable power supply to equipment (loads) and the stable operation of a fuel cell unit.

DETAILED DESCRIPTION OF THE PREFERRED EMBODIMENTS

Detailed embodiments of the present invention involving system structures for control, the specifications of ICs for control, and control methods will be described hereinafter, using the drawings.

Figure 2:
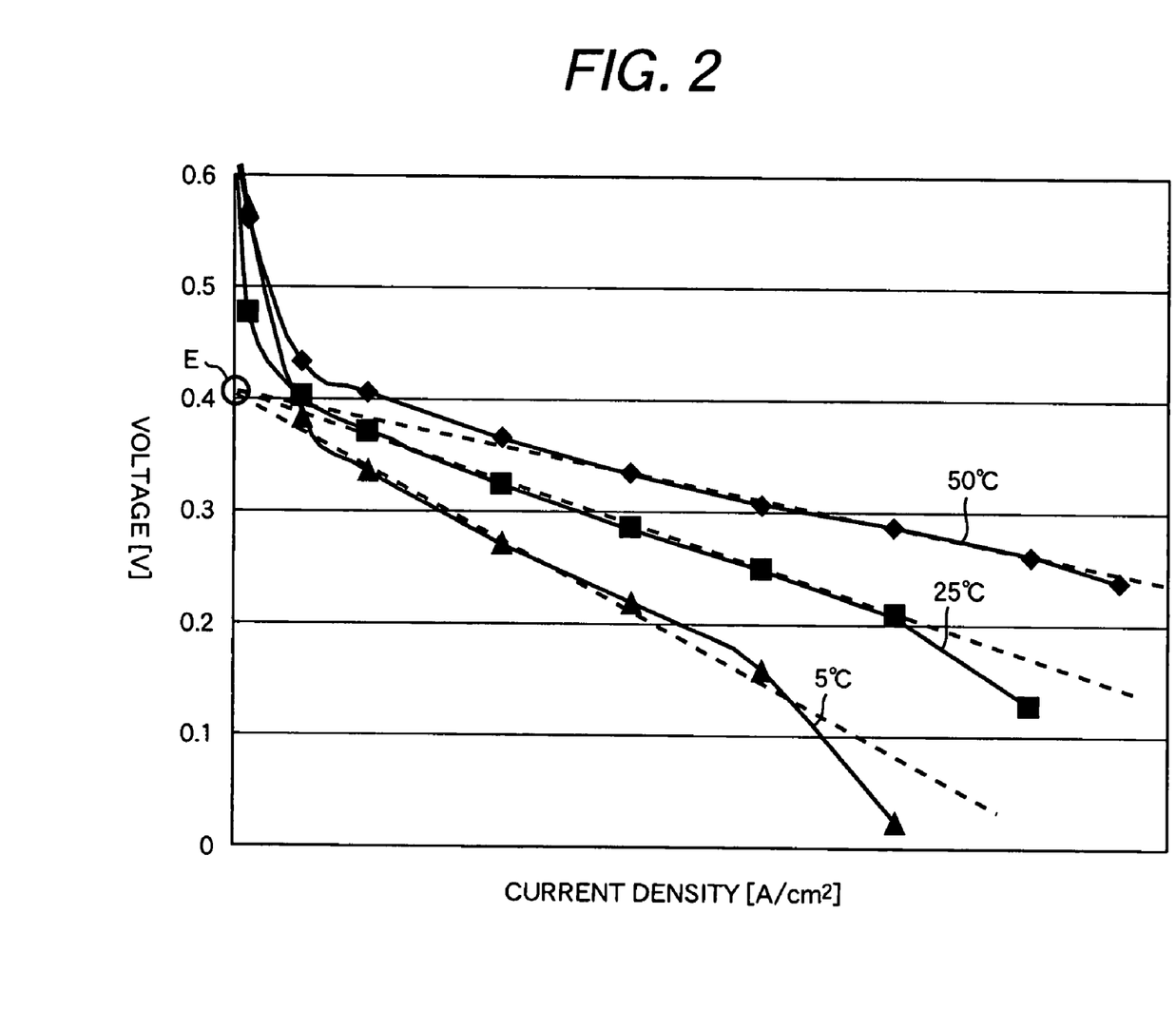
FIG. 2 shows characteristic graphs representing change in the output characteristic of a DMFC depending on temperature.
Figure 3:
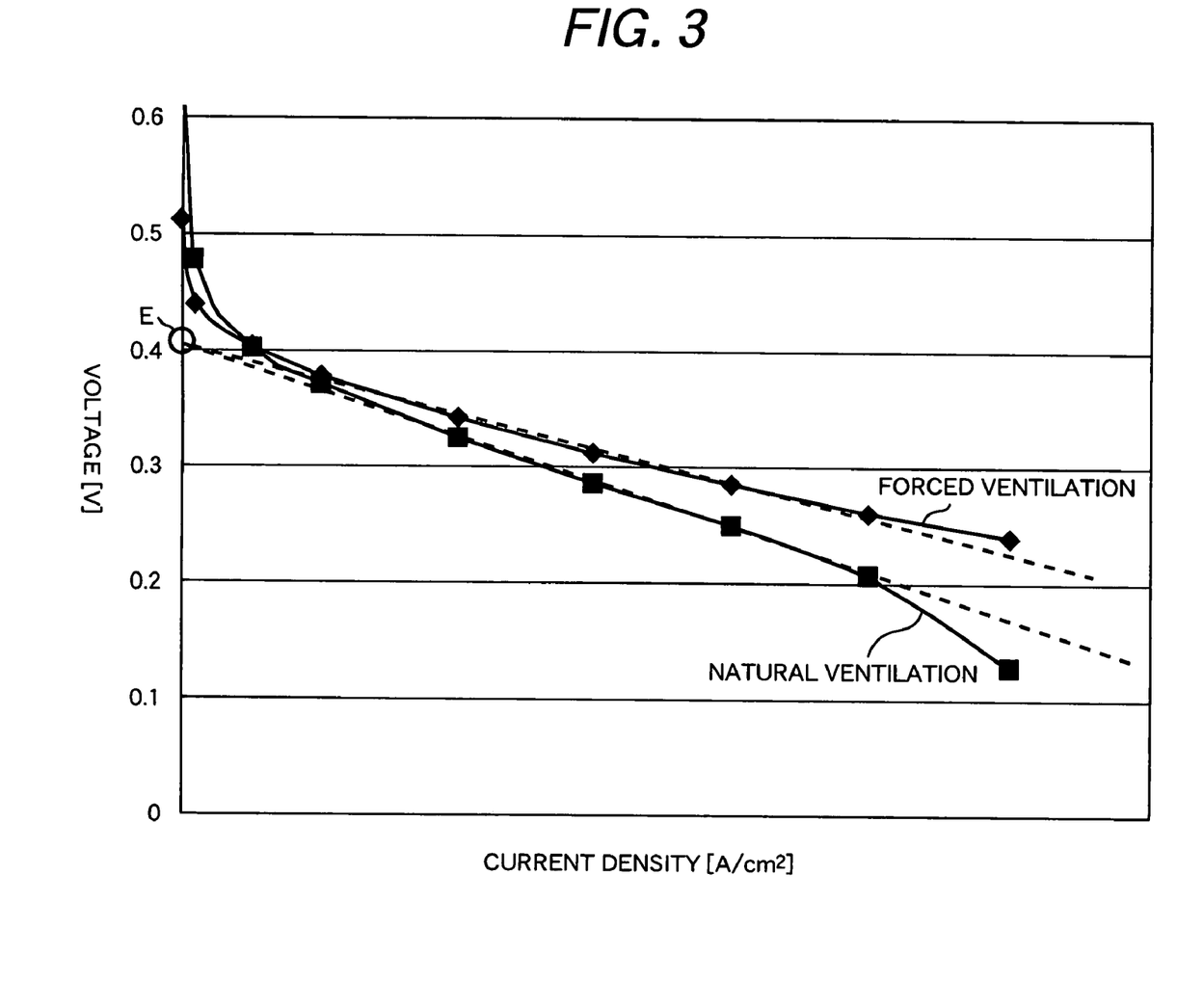
FIG. 3 shows characteristic graphs representing change in the output characteristic of a DMFC depending on change in the air flow rate.
Figure 4:
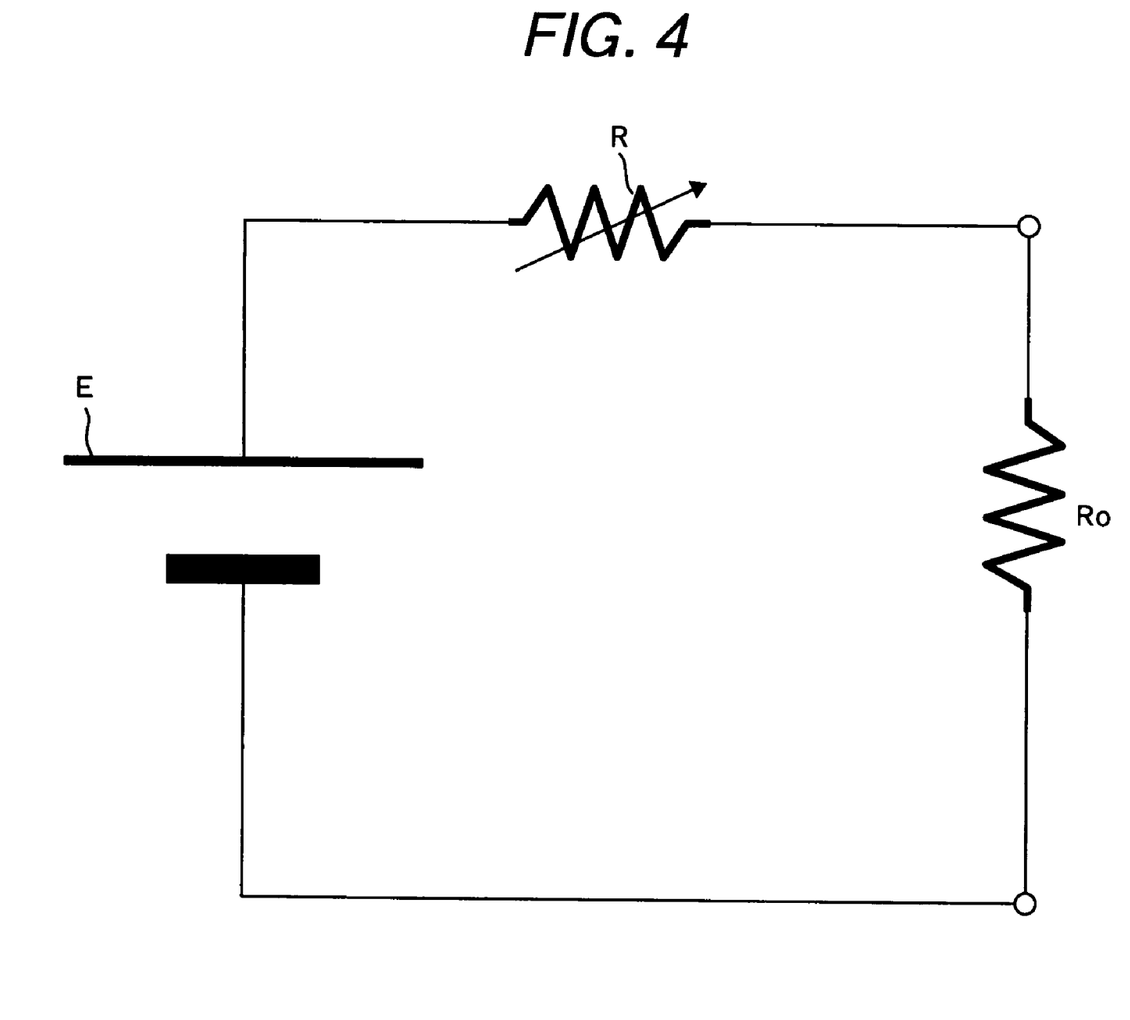
FIG. 4 shows a DC equivalent circuit model of a fuel cell in the present invention.

First, a method of setting the DMFC characteristic in the present invention is described. FIG. 2 shows change in the characteristic of a single DMFC cell depending on temperature and FIG. 3 shows change in the characteristic depending on change in the air flow rate. Noting dashed auxiliary lines plotted in FIGS. 2 and 3, it is seen that the voltage at a current of 0 is about 0.41 V which is the same for both figures. For a generally used voltage region except a region in the vicinity of OCV showing a rapid voltage rise, a DC model of an equivalent circuit of the DMFC can be represented by a constant set voltage E (e.g., 0.41 V); and an internal resistance R of the DMFC which changes depending on the DMFC conditions, as is shown in FIG. 4. Output power W for this model can be expressed by the following equation ($R_o$: load resistance):

$$W = \frac{E^2}{R \times \left(\frac{R}{R_O} + \frac{R_O}{R} + 2\right)} \quad \text{[Equation 1]}$$

Since a condition for making the output power W in the above equation reach a maximum value is $R=R_o$, it has been found that, if the DMFC output voltage is $E/2$, a constant maximum power point is obtained, regardless of the DMFC conditions.

When the present invention is applied, the set voltage E of a single DMFC cell to be used is measured beforehand and multiplied by the number of cells, based on which a power supply apparatus is designed. Of course, a power supply apparatus can be designed by applying this setting method to any other type of fuel cells such as PEFC.

First Embodiment

Figure 5:
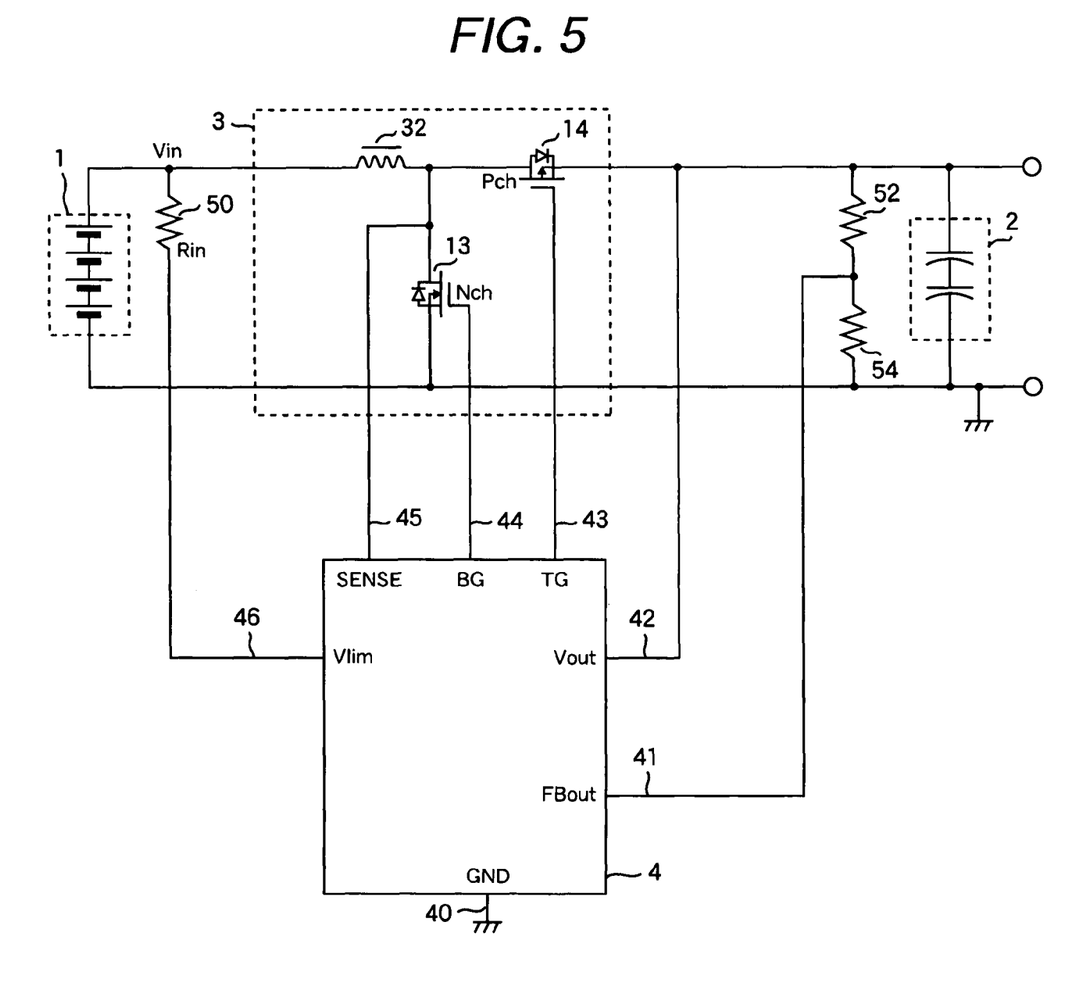
FIG. 5 shows a power supply apparatus configuration according to a first embodiment of the present invention.

A first embodiment of the present invention is described, using FIG. 5.

A power supply apparatus of the present invention is broadly comprised of a fuel cell unit 1, an electric double layer capacitor (hereinafter referred to as a EDLC) 2 which is a charge storing device, a circuit section 3, and a control IC 4. Details of each constituent part will be described below.

In the present invention, the EDLC 2 used as the charge storing device has a withstand voltage of 2.3 V to 3.3 V per cell. If it is composed of two cells as shown in FIG. 5, it is applicable to equipment which has been conventionally driven by a single lithium battery cell or two nickel-metal-hydride (NiMH) cells. Such equipment is, for example, mobile phones, PDAs, digital still cameras, multimedia players, etc. In the case of applications where multiple lithium battery cells are used (e.g., notebook personal computers and the like), the EDLC 2 composed of two to four cells is compatible with two lithium battery cells. The EDLC 2 composed of three to five cells is compatible with three lithium battery cells. Of course, a secondary battery such as a lithium battery may be used as the charge storing device, instead of the EDLC 2. By the provision of the charge storing device in addition to a fuel cell unit 1, as shown in FIG. 5, it is possible to make up a power shortage, even when a needed power for a load is larger than the maximum power obtainable from the fuel cell unit 1. Such cases may occur at the time when performance of the fuel cell unit become temporarily deteriorated or when the needed power for a load is consumed by pulse loads, which typically occurs in mobile phones. In the case of applications with frequent occurrence of pulse loads, the use of the EDLC or the like, which has a good discharging characteristic, is desirable for improving efficiency.

While the first embodiment assumes that DMFCs are used for the fuel cell unit 1, any other type of fuel cells may be used instead. While the fuel cell unit composed of four cells is used in the power supply apparatus shown in FIG. 5, the number of cells can be increased or decreased, taking the efficiency of the circuit portion 3 into consideration.

The circuit portion 3 is configured with a synchronous rectification step-up converter using an inductance L 32, an N-channel power MOSFET 13, and a P-channel power MOSFET 14. In such a step-up converter, the energy from the fuel cell unit 1 is stored into the inductance L during a switching cycle after the N-channel power MOSFET 13 is turned ON (conversely the P-channel power MOSFET 14 is turned OFF). The energy stored in the inductance L together with the energy from the fuel cell unit 1 is charged into the EDLC 2 during a switching cycle after the P-channel power MOSFET 14 is turned ON (conversely the N-channel power MOSFET 13 is turned OFF). Consequently, the charged (stored) voltage of the EDLC 2 becomes higher than the output voltage of the fuel cell unit 1 (in short, the voltage is stepped up).

Thus, the voltage of the EDLC 2 becomes not lower than the voltage of the fuel cell unit 1. Of course, smoothing capacitors may be provided at input and output in addition to the EDLC 2.

The control IC 4 has at least seven terminals altogether: a fuel cell voltage limiting terminal (Vlim) 46, an EDLC 2 voltage receiving terminal (FBout) 41, output voltage and supply voltage receiving terminal (Vout) 42, switch current receiving terminal (SENSE) 45, a P-channel power MOSFET control terminal (TG) 43 via an inverter circuit 24, an N channel power MOSFET control terminal (BG) 44, and a GND terminal (GND). Of course, an IC ON/OFF terminal, a loop compensation terminal, etc. may be provided if necessary in addition to the above terminals.

Figure 6:
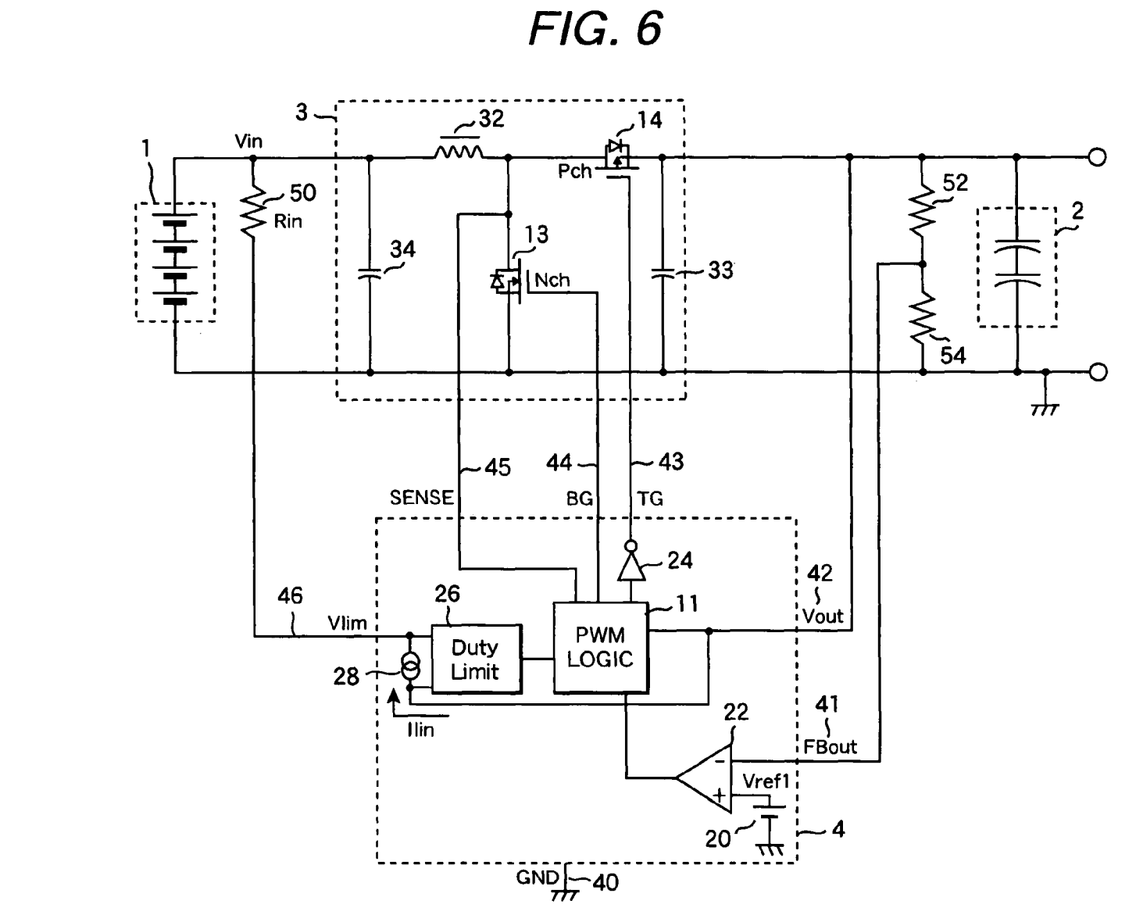
FIG. 6 shows an example of the configuration according to the first embodiment of the present invention including the addition of a functional diagram of a control IC.

FIG. 6 shows an example of a functional diagram of the control IC 4.

Figure 7:
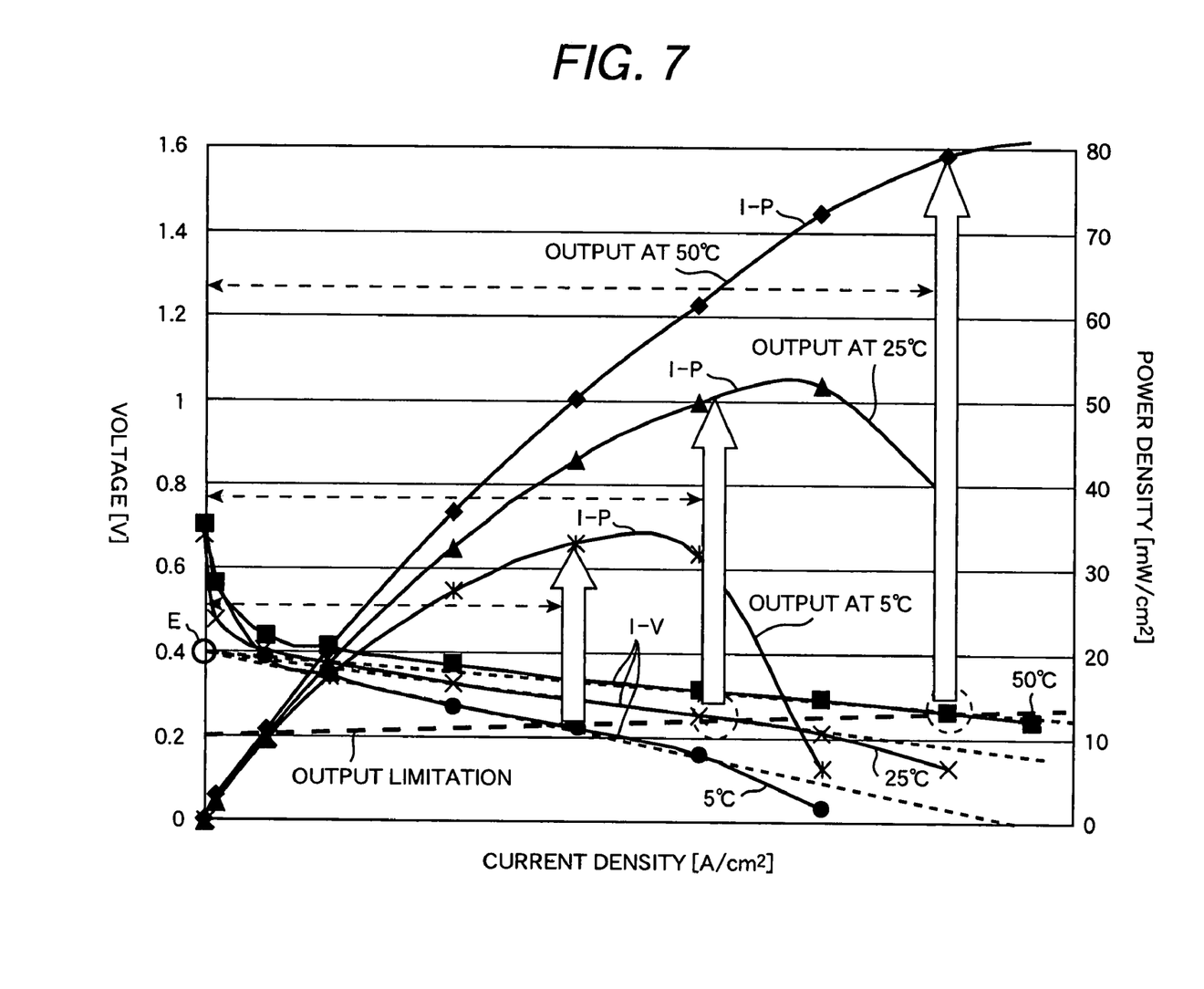
FIG. 7 graphically shows relationships between the limitation function of a control IC and the DMFC output characteristics, according to the first embodiment of the present invention.

A control state on the terminal Vlim, which is a first feature of the present power supply apparatus, is now described. Because the present power supply is configured with the step-up type power supply apparatus, a very small constant current Ilin flows from the Vout terminal 42 via a constant current circuit to the Vlim terminal 46. A Duty Limit circuit 26 is equipped with the following functions: a function for limiting Duty (duty cycle) in proportional to a value of Vout-Vlin voltage (namely a difference voltage between Vout and Vlin; Vlin is a voltage at the Vlim terminal 46); and a function for completely stopping PWM (Pulse Width Modulation) switching operation by controlling a PWM LOGIC circuit 11 when the voltage Vlin at the terminal Vlim becomes not greater than a predetermined voltage. In the present embodiment, since the Duty Limit circuit 26 has the above functions, the voltage where the PWM switching operation is completely is predetermined as "Vstop". It is defined as the following Vstop-expression. Namely, Vstop=Ilin×Rin (50)+Vin. Here, Vin is the output voltage of the fuel cell unit 1, which is an operating input voltage for the power supply apparatus. In the above Vstop-expression, by setting Vin as the maximum power point voltage (namely the operating input voltage at the maximum power point), the value of Vstop can be set at voltages above the maximum power point voltage. Consequently, the apparatus is capable of limiting the output current from the fuel cell unit 1 within current-range of up to the maximum power point assuredly. Additionally, when the fuel runs down or oxygen runs short in the fuel cell 1 and then the voltage Vin becomes below the Vstop, the apparatus is also able to stop the switching operation safely. FIG. 7 shows relationships between the fuel cell output characteristics and the output limitation, graphically explaining the foregoing first feature. In FIG. 7, The output limitation is corresponding to Vstop; upward-pointing arrows indicate the maximum power points in the respective I(current)-P(power) characteristics depending on temperatures; and horizontal broken arrows indicate value within the fuel cell-output voltage range and the current range of up to the maximum power point.

Though the voltage of the output limitation, as shown in FIG. 7, slightly varies depending on the fuel cell output, it is no problem on the power supply control. When comparing the voltage-current density graphs (I-V characteristics) representing the DMFC outputs at different temperatures to the output limitation graph, the power supply apparatus of the first embodiment of the invention operates as follows. That is, the apparatus operates in the regions not lower than the points at which the fuel cell output graph at each temperature intersects the output limitation graph, but does not exceed the maximum power.

Next, control operation as to the FBout terminal 41, which is a second feature of the present power supply apparatus, is described. The FBout terminal 41 is configured in the same way as the output voltage feedback mechanism of a general DC/DC converter. That is, Vref 1 of the reference voltage 20 and the voltage at the FBout terminal 41 are input to a comparator 22. Here, the Vref 1 of the reference voltage 20 corresponds with the maximum power or around thereof of the fuel cell unit 1. The voltage at the FBout terminal 41 corresponds with the output power of the DC/DC converter 33, which is sensed by dividing resistances 52 and 54. According to the output of the comparator 22, the PWM LOGIC circuit 11 controls the PWM switching operation so that a stable output power of the DC/DC converter 33 can be obtained. An output of the comparator 22 indicates the difference of the output power of the DC/DC converter 33 and the fuel cell power. As a result of the output of the comparator 22, if the output power (the requested load power) of the DC/DC converter 33 is far lower than the maximum power from the fuel cell unit, the output voltage of the DC/DC converter 33 is controlled by the PWM LOGIC 11 to be constant, as is the case for the general DC/DC converter. If the output power of the DC/DC converter 33 becomes close to the maximum power from the fuel cell unit (output power<fuel cell maximum power), PWM limit Duty control 26 is performed by PWM LOGIC 11. When the output power of the DC/DC converter 33 is equal to or greater than the fuel cell power, the output of the power charge storing device such as the EDLC 2 is supplied to the load so as to make up for a shortage of the fuel cell power. The output voltage is determined depending on how much the charge storing device has been charged. In this case, control is performed so that the PWM continues to operate at a maximum value within the Duty limitation.

Figure 8:
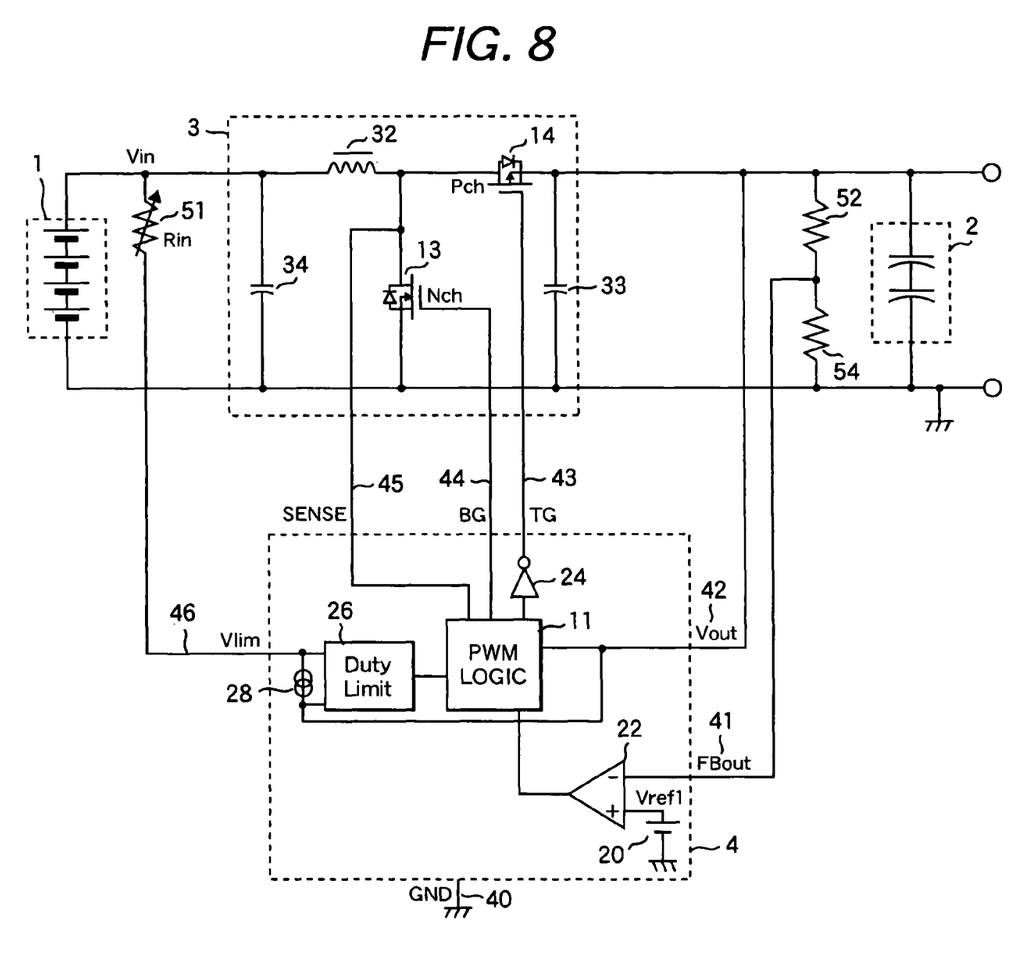
FIG. 8 is an example of the configuration employing a thermistor instead of a limit voltage setting resistor in the control IC functional diagram according to the first embodiment of the present invention.
Figure 9:
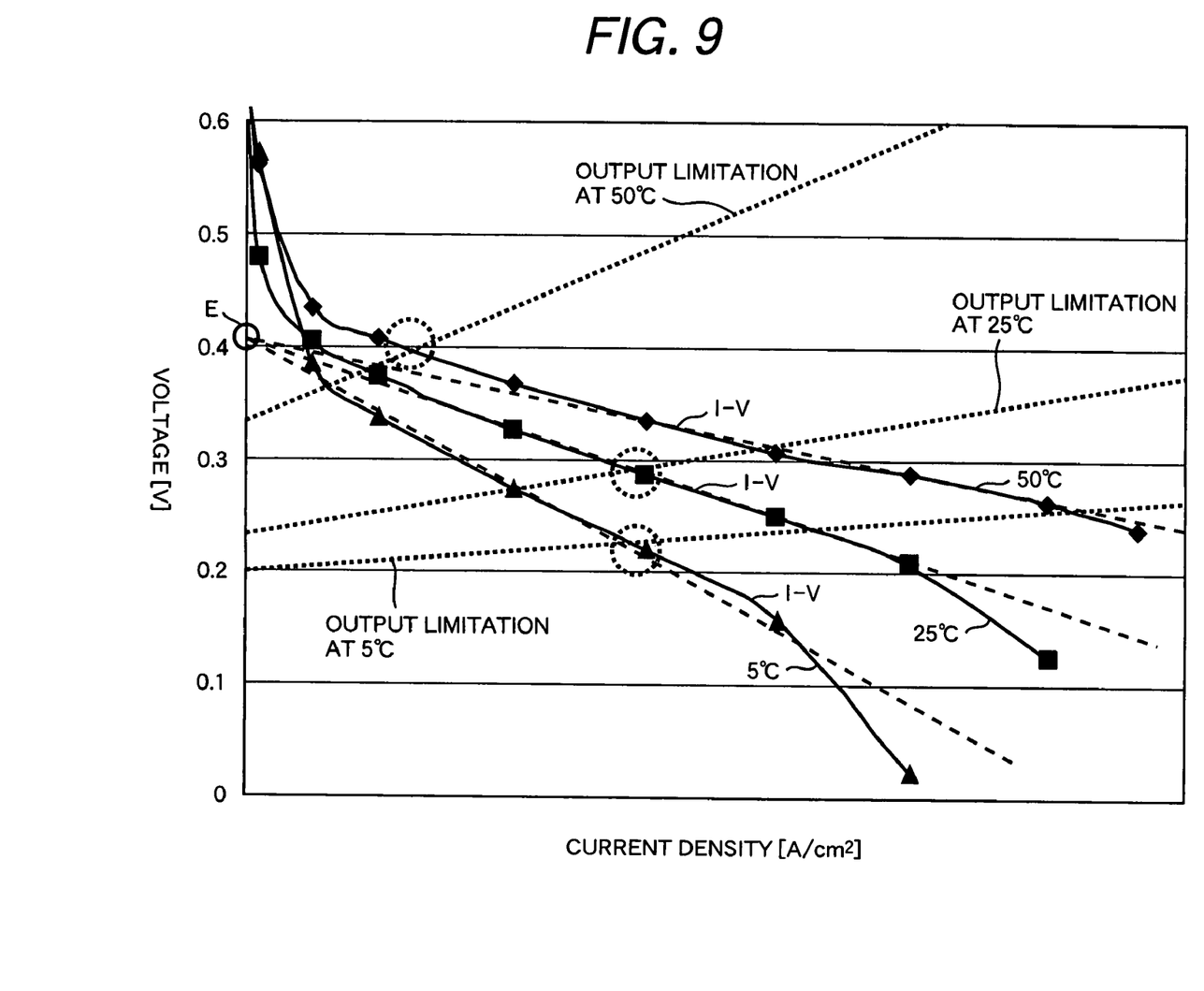
FIG. 9 graphically shows relationships between the limitations at different temperatures and the DMFC output characteristics, according to the first embodiment of the present invention.

Furthermore, control operation by Rin 50, which is a third feature of the present power supply apparatus, is described. As described with regard to the foregoing first feature, by modifying the Rin 50 value in relation to the Ilin and Vstop values, the designer can flexibly design a value of the output limitation according to the number of fuel cells in use. As is shown in FIG. 8, it is possible to add a temperature limitation function by adopting an NTC (Negative Temperature Coefficient) thermistor 51 as Rin. FIG. 9 shows relationships between the fuel cell output characteristics and the output limitation when the power supply apparatus employs the NTC thermistor 51. The arrangement of FIG. 9 is the same as that of FIG. 6 except Rin. The NTC thermistor 51 exhibits a characteristic in which its resistance is high at low temperature and low at high temperature. By applying the NTC thermistor 51 as Rin, Vin to be limited in low temperature conditions can be designed to be lower, and Vin to be limited in high temperature conditions can be set higher. As temperature rises, control is performed to reduce current that is drawn from the fuel cell unit 1. Consequently, the fuel cell unit 1 can be prevented from getting so hot, e.g., over 45° C. as to burn the user's hand.

The present power supply apparatus is characterized in that the PWM LOGIC 11 for the DC/DC converter controls duty by a fuel cell voltage during the normal control operation. Thus, the apparatus can be realized by using an existing IC for the DC/DC converter.

Figure 10:
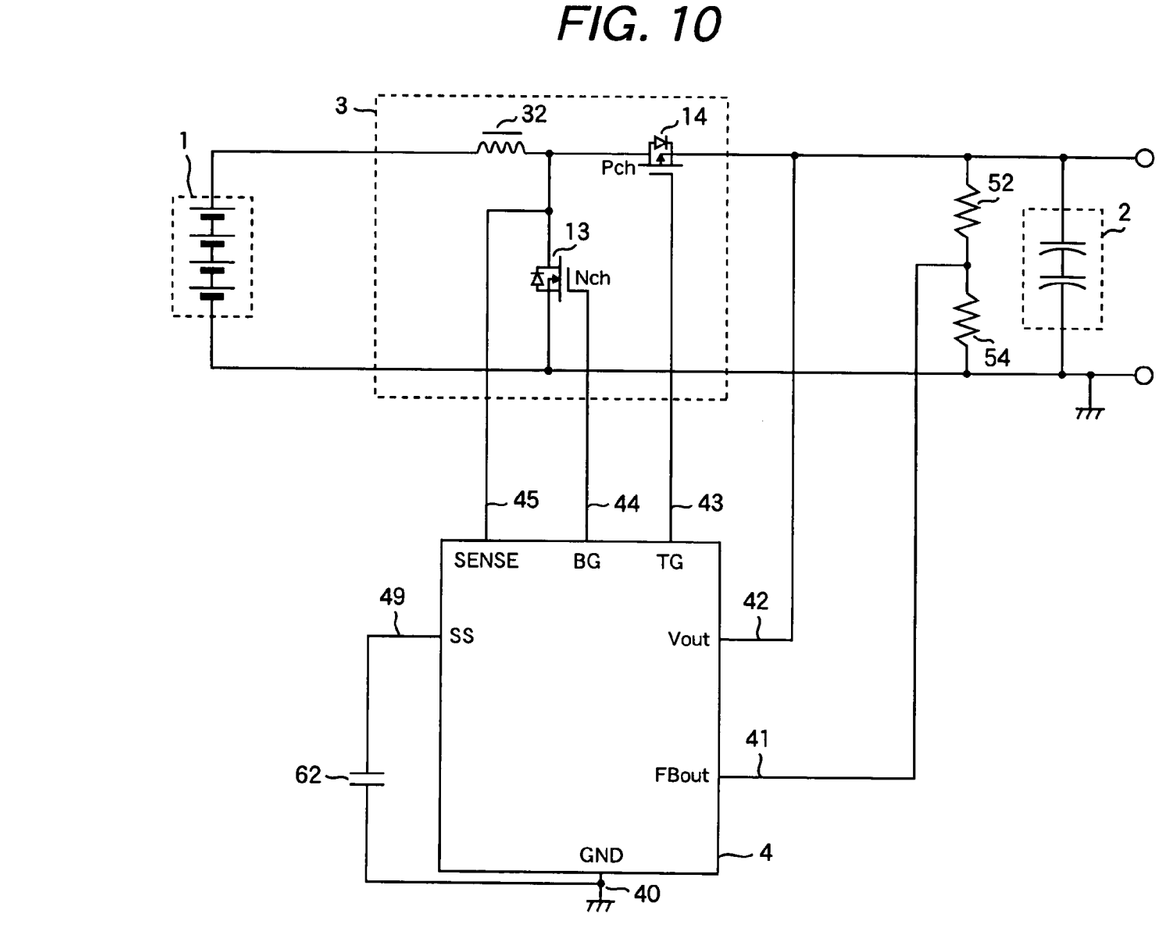
FIG. 10 shows a conventional control IC configuration having a soft start function.

FIG. 10 shows an example of a configuration of a conventional control IC 4. Here is the configuration of the control IC 4 equipped with a soft start function, wherein a capacitor C 62 is connected between a soft start terminal (hereinafter referred to as an SS terminal) 49 and a GND terminal 40. The capacitor C 62 is gradually charged by a constant current circuit within the IC and a high-resistance switch. The control IC 4 is configured that the soft start function performs output power limitation such as limiting the duty and switching current, until the voltage at the SS terminal 49 rises above a predetermined value. By modifying this configuration by connecting the SS terminal via the above-mentioned resistor Rin 50 to the same input end as in the above apparatus, the same effect as obtained by the foregoing embodiment can also be realized.

Second Embodiment

Figure 11:
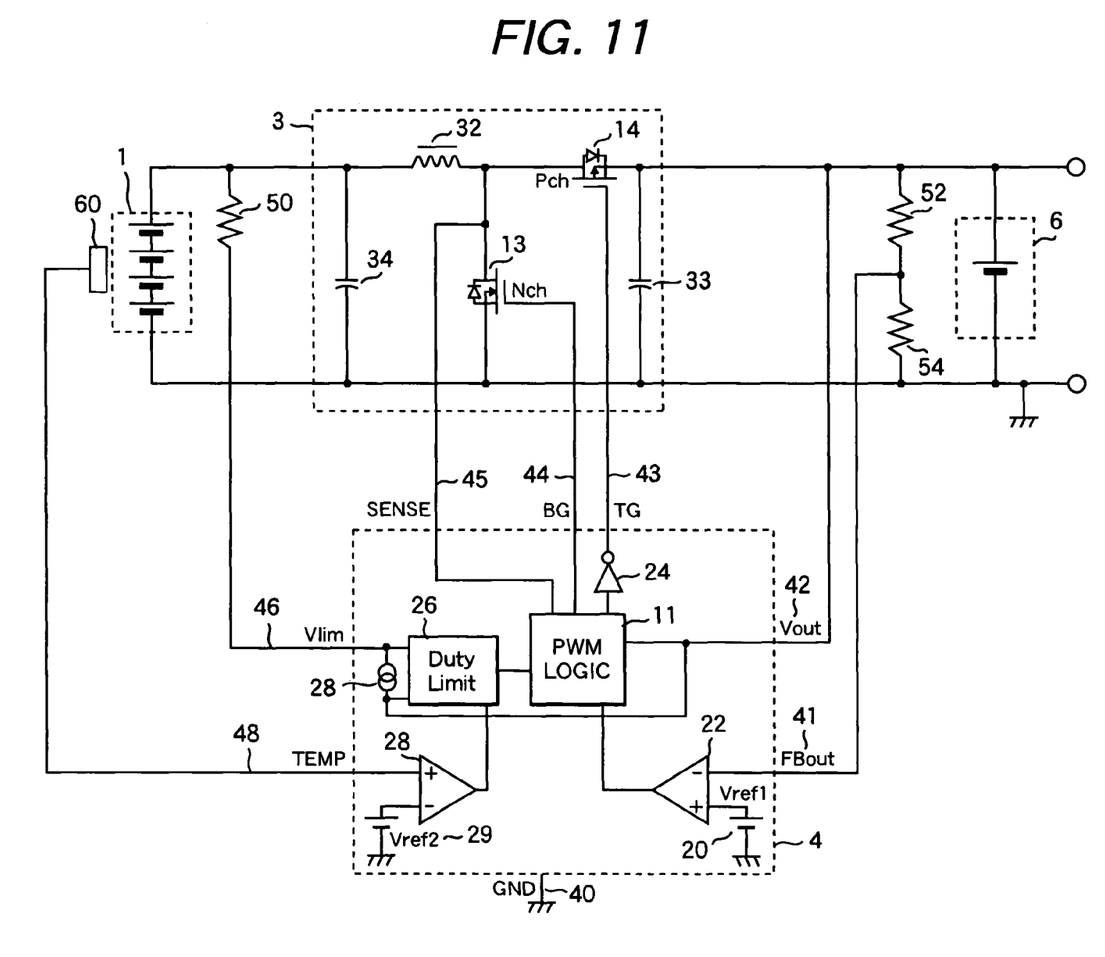
FIG. 11 shows a power supply apparatus configuration according to a second embodiment of the present invention, including a control IC functional diagram.

A second embodiment of the present invention is described, using FIG. 11. Unless specifically mentioned, components assigned the same reference numbers as in the foregoing circuit examples of the apparatus have the same structures and effects.

The power supply apparatus of the second embodiment has a configuration in which a fuel cell temperature control terminal is provided separately from the fuel cell voltage limitation terminal. As compared with the forging first embodiment, in the second embodiment apparatus, the fuel cell temperature control terminal (hereinafter referred to as TEMP) 48 is added to the control IC 4. Temperature information for the fuel cell unit 1 is obtained by a sensor 60 such as a thermistor or temperature IC, and input to the TEMP 48. The internal structure of the control IC 4 differs from the foregoing embodiment. Two feedback values, namely the Vout-Vlin value and the temperature voltage-Vref2 (29) value are input to the Duty Limit circuit 26. And then based on these input values, the maximum duty of the PWM LOGIC 11 is limited. Control operation comprises two limitations, the limitation by the fuel cell voltage Vin, which is the same as described for the first embodiment, and the limitation by fuel cell temperature. Appropriate control is performed adaptively to each of the voltage and temperature conditions of the fuel cell unit.

In the second embodiment, a lithium battery 6 is used as the charge storing device and, therefore, this embodiment is applicable to devices driven by a single lithium battery cell or two NiMH cells which have been used conventionally (e.g., mobile phones, PDAs, digital still cameras, multimedia players, etc.). Of course, the EDLC may be used as the charge storing device as the lithium battery 6.

Third Embodiment

Figure 12:
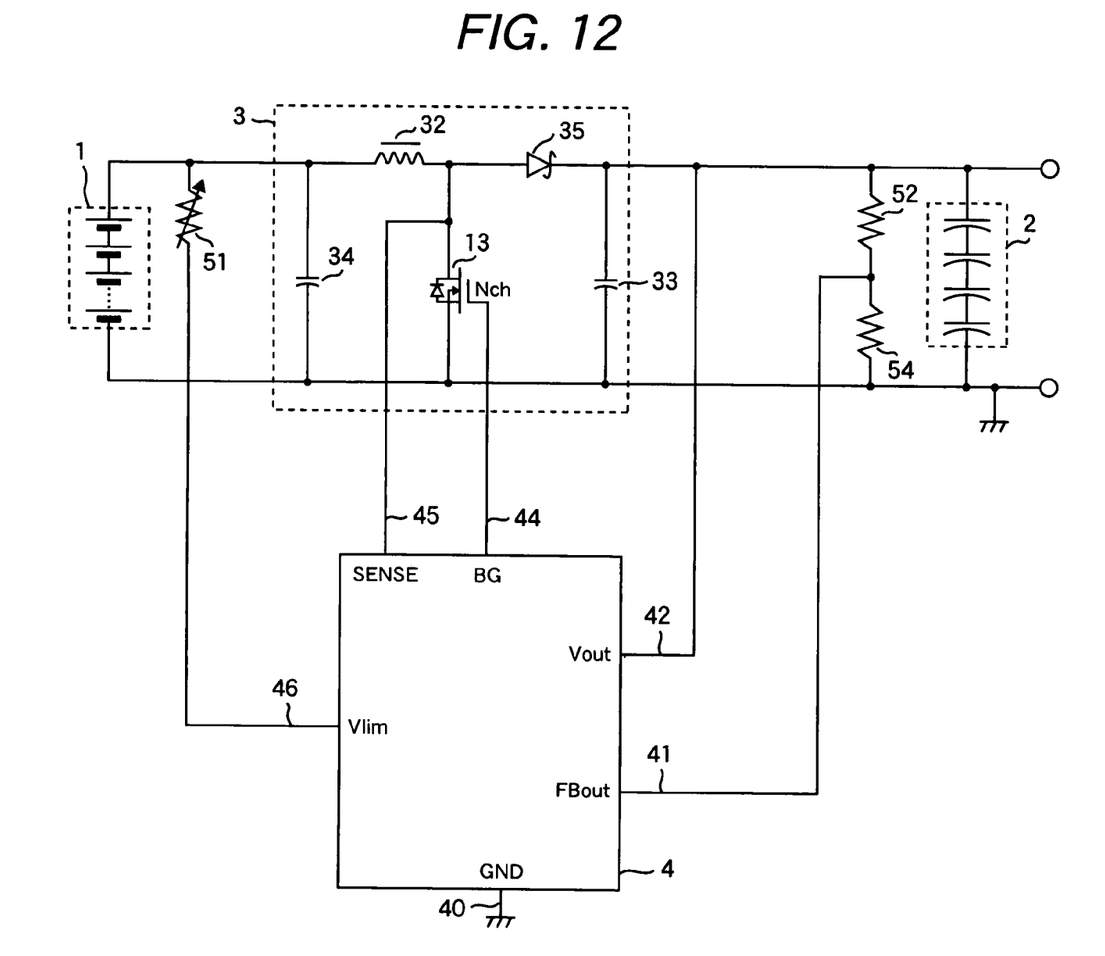
FIG. 12 shows a power supply apparatus configuration according to a third embodiment of the present invention.

A third embodiment of the present invention is described, using FIG. 12. Unless specifically mentioned, components assigned the same reference numbers as in the foregoing circuit examples of the apparatus have the same structures and effects.

As compared with the first and second embodiments, the third embodiment is an example of a power supply apparatus in which the circuit portion 3 is not the synchronous rectification type and has changed to a step-up chopper type employing a schottky diode 35. This configuration is effective for increasing the voltage at the output end of the apparatus, higher than the apparatuses of the first and second embodiments.

Detail of the control IC 4 will be described below. As compared with the first and second embodiments, the control IC 4 of the third embodiment dispenses with the P-channel power MOSFET control terminal (TG). For the internal structure of the control IC 4, either the corresponding structure in the first embodiment apparatus or that in the second embodiment apparatus may be used.

In the third invention, because the EDLC 2 used as the charge storing device has a withstand voltage of 2.3 V to 3.3 V per cell, if it consists of four cells as shown in FIG. 12, it is applicable to devices which are driven by two or three lithium battery cells have been used conventionally (e.g., notebook personal computers. etc.). Of course, a secondary battery such as a lithium battery may be used as the charge storing means, instead of the EDLC 2.

Fourth Embodiment

Figure 13:
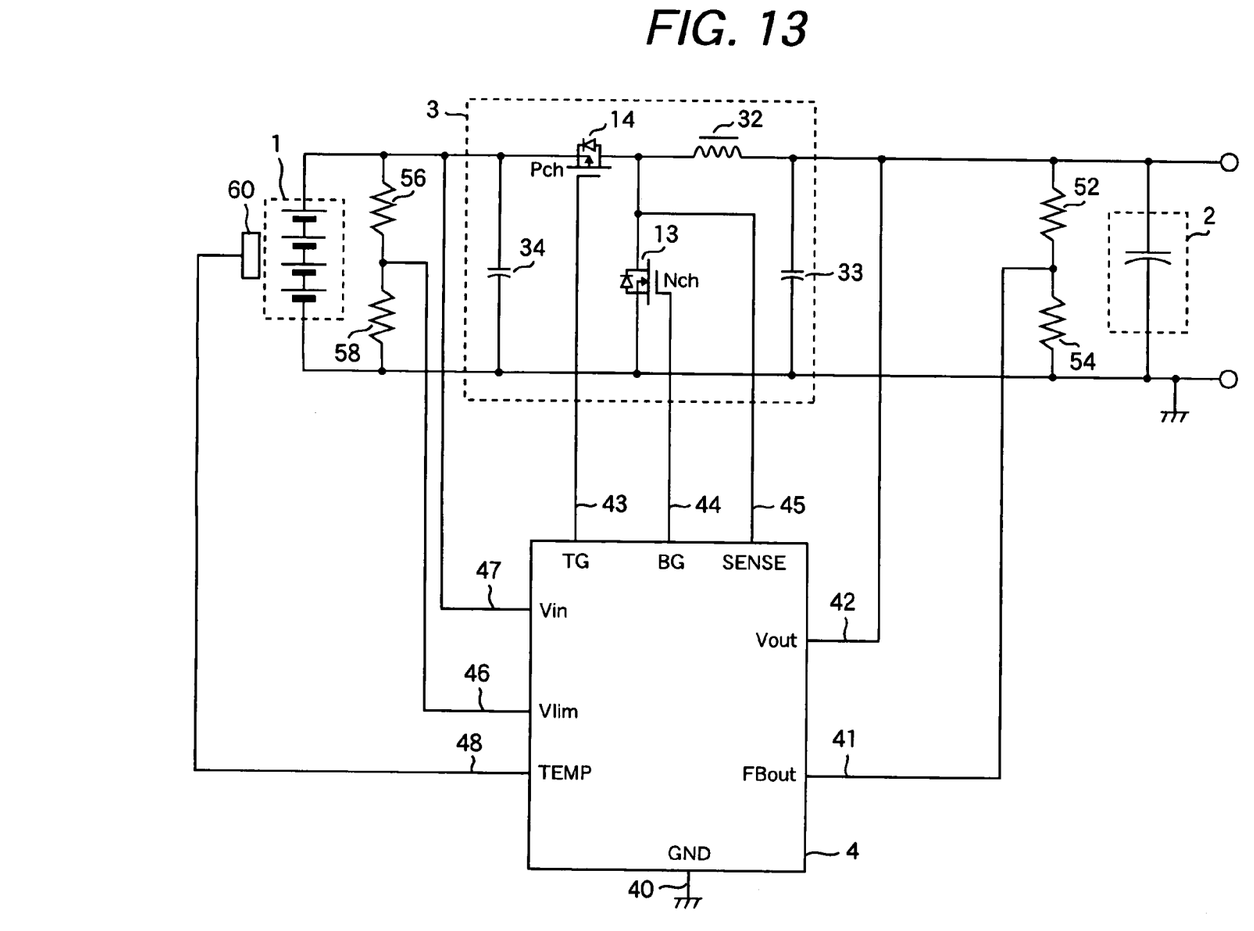
FIG. 13 shows a power supply apparatus configuration according to a fourth embodiment of the present invention.

A fourth embodiment of the present invention is described, using FIG. 13. Unless specifically mentioned, components assigned the same reference numbers as in the foregoing circuit examples of the apparatus have the same structures and effects.

The fourth embodiment is an example of a power supply apparatus in which the circuit portion 3 has changed to a step-down chopper type. The thus configured apparatus is adaptable to a load voltage lower than the voltage of the fuel cell unit 1.

Detail of the control IC 4 in the fourth embodiment apparatus will be described below. As compared with the first through third embodiments, the control IC 4 is equipped with a Vin terminal 47 as an IC power and gate drive voltage. Because of the step-down type, a method of designing a limit voltage by dividing Vlin 47 is used. For the internal structure of the control IC 4, either the corresponding structure in the first embodiment apparatus or that in the second embodiment apparatus may be used.

In the fourth invention, because the EDLC 2 used as the charge storing device has a withstand voltage of 2.3 V to 3.3 V per cell, if it consists of one cell as shown in FIG. 13, it is applicable to equipment which is driven on a low voltage such as 1.8 V. Of course, a secondary battery such as a lithium battery or nickel-hydrogen battery may be used as the charge storing means, instead of the EDLC 2.

While the four embodiments have been described above, it will be appreciated that combined use of some of the foregoing embodiments is allowed according to application, when carrying out the invention.

What is claimed is:

1. A power supply apparatus comprising:
a fuel cell unit;
a circuit section that performs DC/DC conversion of an output from the fuel cell unit and provides an output to a power supply output terminal;
a power charge storing device which is provided between the circuit section and the power supply output terminal so as to charge the output of the circuit section and supply charged power to a load so as to make up for a power shortage of the fuel cell unit and when a requested load power from a load is greater than a fuel cell maximum power of the fuel cell unit; and
a control device for the circuit section that performs PWM (Pulse Width Modulation) control;
wherein the control device comprises a PWM logic circuit that controls a pulse width modulation switching operation of the circuit section so that stable output power of the circuit section is obtained, a duty limit circuit that limits a duty cycle for the PWM control in proportion to an input voltage of the circuit section, the duty limit circuit enabling stopping of the PWM switching operation of the circuit section by controlling the PWM logic circuit when the input voltage of the circuit section becomes not greater than a predetermined voltage, a fuel cell voltage limiting terminal that is connected between the fuel cell and the circuit section so as to provide the input voltage of the circuit section to the duty limit circuit, a power charge storing device voltage receiving terminal that receives a divided voltage between dividing resistances connected in parallel to the power charge storing device and that provides an output resulting from comparing the divided voltage with a predetermined reference voltage, an output voltage receiving terminal that is connected to an output side of the circuit section so as to provide the output of the circuit section to the PWM logic circuit, and a control terminal that is connected to the circuit section so as to control the circuit section;

wherein the control device controls an amount of power supply so that an operating input voltage range for the power supply apparatus is not lower than a maximum power voltage of the fuel cell unit and controls a maximum duty cycle for the PWM control so that as a difference between a fuel cell unit output voltage and the predetermined voltage becomes larger, the maximum duty cycle for the PWM control increases;

wherein the output voltage receiving terminal also provides a constant current to the fuel cell voltage limiting terminal via a constant current circuit; and wherein the predetermined voltage which is used as a reference voltage for stopping of the PWM logic circuit is set by adding a margin voltage generated by flowing the constant current through a resistor disposed between the fuel cell unit and the fuel cell voltage limiting terminal to the maximum power voltage of the fuel cell unit.

2. The power supply apparatus according to claim 1, wherein the resistor for making the margin voltage is constituted by a NTC (Negative Temperature Coefficient) thermistor through which the constant current from the constant current circuit flows; and wherein the predetermined voltage increases as the temperature of the fuel cell unit increases.

3. The power supply apparatus according to claim 1, wherein the duty limit circuit limits the duty cycle for the PWM control in proportion to a difference voltage between an output voltage and the input voltage of the circuit section.

\* \* \* \* \*